(12) United States Patent
Ranjan Jena et al.

(10) Patent No.: US 11,379,350 B2
(45) Date of Patent: Jul. 5, 2022

(54) INTELLIGENT SOFTWARE TESTING

(71) Applicant: Accenture Global Solutions Limited, Dublin (IE)

(72) Inventors: Chinmaya Ranjan Jena, Bangalore (IN); Lalitha Yengaldas, Hyderabad (IN); Sunder Ranganathan Nochilur, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 144 days.

(21) Appl. No.: 16/999,509

(22) Filed: Aug. 21, 2020

(65) Prior Publication Data
US 2022/0058114 A1 Feb. 24, 2022

(51) Int. Cl.
| | |
|---|---|
| *G06F 11/36* | (2006.01) |
| *G06F 16/2455* | (2019.01) |
| *G06N 20/00* | (2019.01) |
| *G06F 40/284* | (2020.01) |
| *G06F 40/186* | (2020.01) |
| *G06F 40/174* | (2020.01) |

(52) U.S. Cl.
CPC .... *G06F 11/3688* (2013.01); *G06F 16/24553* (2019.01); *G06F 40/174* (2020.01); *G06F 40/186* (2020.01); *G06F 40/284* (2020.01); *G06N 20/00* (2019.01)

(58) Field of Classification Search
CPC ........................................................ G06F 11/36
See application file for complete search history.

(56) References Cited

U.S. PATENT DOCUMENTS 8,832,205 B2 9/2014 Nelson et al.
10,073,763 B1 9/2018 Raman et al.
(Continued)

OTHER PUBLICATIONS

Lorin,Ilia; Natural Language Processing (NLP) Use Cases in Business. MObiDev; [retrieved on Sep. 10, 2020] Retrieved from the Internet https://mobidev.biz/blog/natural-language-processing-nlp-use-cases-business (10 pp).
(Continued)

*Primary Examiner* — Jae U Jeon
(74) *Attorney, Agent, or Firm* — Plumsea Law Group, LLC

(57) ABSTRACT

A system and method that improves the efficiency and accuracy of template selection process by applying machine learning to perform natural language processing (NLP) to automatically interpret the intent of the test scenarios and to match the intent of the test scenarios to appropriate test template(s). The system and method can use keyphrases and part-of-speech (POS) tokens to accurately capture the intent of test scenarios and templates. The system and method can additionally use machine learning to perform NLP to identify information from the test scenario(s) that relates to fields in templates to automatically fill in fields in the selected test template(s). In situations where the processing of the test scenario(s) does not provide all of the information necessary to fill every field of a template, the system and method can use machine learning to perform NLP to automatically create and execute a search statement to find the missing information related to empty fields in an application database.

20 Claims, 9 Drawing Sheets

(56) References Cited

U.S. PATENT DOCUMENTS

| | | | |
|---|---|---|---|
| 2010/0070231 A1* | 3/2010 | Hanumant | G06F 11/3696 702/123 |
| 2013/0263089 A1 | 10/2013 | Banerjee et al. | |
| 2016/0179659 A1 | 6/2016 | Champlin-Scharff et al. | |
| 2018/0267887 A1* | 9/2018 | Dsouza | G06F 40/30 |
| 2019/0079754 A1* | 3/2019 | Makkar | G06F 8/73 |
| 2019/0391985 A1 | 12/2019 | Vashist et al. | |

OTHER PUBLICATIONS

Testing Visualization-Algorithmic Trading, Trading Robots—MetaTrader 5 Help. MetaQuotes Ltd. Copyright 2000-2020. Retrieved from the Internet https://www.metatrader5.com/en/terminal/help/algotrading/visualization; [retrieved on May 29, 2020]) (11 pp).

Kosseim, L., et al., "Using Information Extraction and Natural Language Generation to Answer E-Mail," source: Proceedings of the 5th International Conference on Applications of Natural Language to Information Systems (NLDB'2000). Jun. 2000. Versailles, France (12 pp).

\* cited by examiner

LOAD DATA SCENARIO: TEST SCENARIOS_EVENTS.XLSX

[CHOOSE FILE] NO FILE CHOSEN  [LOAD]

PRODUCT TYPOLOGY [SELECT ▽]

| | INDENTIFIED TEMPLATES |
|---|---|
| | TRADE INSERT |
| | OSP |
| | CANCEL & REISSUE-EVENT |

TRADE INSERT  OSP  EVENT

| ROW_LABEL | ROW_DESC | GROUP ID | USER.LABEL | NOTEPAD.LABEL |
|---|---|---|---|---|
| 1 | | | USER.ONE | IRS VANILLA |

[⬇ DOWNLOAD]

[TRADE DETAILS] [USER CONFIG] [NOTEPAD CONFIG]

⊙ LOAD DATA

▤ TEST SCENARIOS

+1_TO VALIDATE THE INSERTION OF IRS THROUGH...
 OSP VALIDATION
 PERFORM OF TRADE EVENT

+2_PERFORM CNR EVENT ON AN IRS TRADE
 OSP VALIDATION

+1_TO VALIDATE THE INSERTION OF IRS THROUGH...
 OSP VALIDATION
 PERFORM OF TRADE EVENT

INTELLIGENT SOFTWARE TESTING

TECHNICAL FIELD

The present disclosure generally relates to intelligent software testing. More specifically, the present system and method generally relate to applying machine learning to automatically select testing template(s) and to automatically fill in fields in the selected testing template(s).

BACKGROUND

Software testing is challenging to automate for processes involving complex calculations and/or navigation across multiple screen. Most traditional automated testing tools (e.g., Selenium™, Micro Focus Unified Functional Testing, and Tricentus Tosca™) are more geared toward web-based application testing and focus on capturing user interactions on a single frontend screen and simpler actions, such as entering personal information (e.g., name and address). Processes involving complex calculations and/or navigation across multiple screens cannot be captured and tested in the same way. Rather, current testing tools for these processes require subject matter expert (SMEs) to have extensive involvement with preparing testing conditions before test execution. For example, while capital markets trading platforms (e.g., Murex and Calypso) provide a testing tool having test templates (e.g., spreadsheets) that can be automatically executed, these templates require SMEs having knowledge of both the business processes and testing tool to select the appropriate templates and to fill in the information needed to execute the test templates. Because SMEs manually select and prepare the templates, many mistakes are made and false positives are common. Additionally, when new versions of software test tools are released, new versions of the test templates accompanying these test tools are also released. The new versions of test templates may have changes to the fields, such as additions, deletions, and movement in position. The SMEs must track the changes and then learn to adjust their processes manually.

Certain desktop applications, which are not web-based, can be central processing unit (CPU) and memory intensive. Thus, executing both the desktop application and a test automation tool meant to test the desktop application on the same desktop deteriorates performance significantly, causing automated testing to be nearly impossible.

There is a need in the art for a system and method that addresses the shortcomings discussed above.

SUMMARY

The disclosed system and method for software testing solve the problems discussed above by applying machine learning to perform natural language processing (NLP) to interpret a test scenario to automatically select a testing template and to automatically fill in fields in the selected testing template(s). As discussed above, while certain applications offer testing tools, these tools require the selection of test templates appropriate for specific test scenarios. Test scenarios include one or more test cases having text descriptions summarizing the purpose, process, and expected result of test cases. For example, a test scenario may be provided in a spreadsheet having a column for each of these items and one or more rows for each test case. As discussed above, SMEs typically use their esoteric knowledge and experience to select test templates appropriate for test scenarios. This selection process requires inferring the intents (e.g., business process, event, and role) of the test scenario and the test template to appropriately match the test templates to the test scenario. The disclosed system and method improves the efficiency and accuracy of template selection process by applying machine learning to perform NLP to automatically interpret the intent of the test scenarios and to match the intent of the test scenarios to the appropriate test template(s). Specifically using keyphrases and part-of-speech (POS) tokens accurately capture the intent of test scenarios and templates without the need for knowledge of business processes, application processes, and testing tools related to the test scenarios or templates.

As discussed above, in addition to requiring SMEs to select appropriate test templates for test scenarios of interest, current tools require SMEs to fill in the information needed to execute the test templates. The SMEs must not only use their own personal knowledge to fill the information but must also know where to find information that is not within their personal knowledge. The disclosed system and method for software testing uses machine learning to perform NLP to identify information from the test scenario(s) that relates to fields in templates to automatically fill in fields in the selected test template(s) without the need for knowledge of business processes, application processes, and testing tools related to the test scenarios or templates. In situations where the processing of the test scenario(s) does not provide all of the information necessary to fill every field of a template, the disclosed system and method for software testing uses machine learning to perform NLP to automatically generate and execute a search statement to find the missing information related to each empty field in an application database. Using machine learning accelerates the automation of the decision making (e.g. template selection) and activities (e.g., template filling) at various stages of testing. For example, specific knowledge of business processes, an application's processes, and a testing tool are not necessary for automatic execution of tests for the same application and testing tool.

The disclosed system and method accommodates the release of new versions of test templates by comparing the new versions to the old versions and identifying the changes to the fields, including any additions, deletions, or movement in position, as well as any mandatory/optional attribute of the fields using text comparison. The template metadata captured for any of these changes is updated in the template repository. Upon updating test templates, the system selects and fills the updated test templates in place of the old test templates.

In one aspect, the disclosure provides a computer implemented method of testing software. The method may include obtaining a test scenario having at least one test case, the test scenario configured to test an application. The method may include applying machine learning to perform natural language processing (NLP) to determine features of the test scenario. The method may include using the determined features to automatically select a testing template corresponding to the test scenario from a template repository. The method may include matching the determined features to template metadata describing the selected testing template. The method may include using the matched template metadata to automatically fill fields in the selected testing template. The method may include identifying at least one empty field in the selected testing template after the matched template metadata is used to automatically fill fields. The method may include identifying at least one database table and corresponding column in an application database that is mapped to the at least one identified empty field, wherein the application database stores information related to the application. The method may include extracting a filter condition and selection criteria from the determined features. The method may include using the extracted filter condition and selection criteria and the at least one database table and corresponding column to generate a structured query language (SQL) statement. The method may include executing the SQL statement to search for data corresponding to the at least one identified empty field. The method may include using the data to fill the at least one identified empty field to produce a fully filled test template. The method may include using the fully filled test template to execute the test scenario.

In yet another aspect, the disclosure provides a non-transitory computer readable medium storing software that may comprise instructions executable by one or more computers which, upon execution, cause the one or more computers to: (1) obtain a test scenario having at least one test case, the test scenario configured to test an application; (2) apply machine learning to perform natural language processing (NLP) to determine features of the test scenario; (3) use the determined features to automatically select a testing template corresponding to the test scenario from a template repository; (4) match the determined features to template metadata describing the selected testing template; (5) use the matched template metadata to automatically fill fields in the selected testing template; (6) identify at least one empty field in the selected testing template after the matched template metadata is used to automatically fill fields; (7) identify at least one database table and corresponding column in an application database that is mapped to the at least one identified empty field, wherein the application database stores information related to the application; (8) extract a filter condition and selection criteria from the determined features; (9) using the extracted filter condition and selection criteria and the at least one database table and corresponding column to generate a structured query language (SQL) statement; (10) execute the SQL statement to search for data corresponding to the at least one identified empty field; (11) use the data to fill the at least one identified empty field to produce a fully filled test template; and use the fully filled test template to execute the test scenario.

In yet another aspect, the disclosure provides a system for testing software, which comprises one or more computers and one or more storage devices storing instructions that may be operable, when executed by the one or more computers, to cause the one or more computers to: (1) obtain a test scenario having at least one test case, the test scenario configured to test an application; (2) apply machine learning to perform natural language processing (NLP) to determine features of the test scenario; (3) use the determined features to automatically select a testing template corresponding to the test scenario from a template repository; (4) match the determined features to template metadata describing the selected testing template; (5) use the matched template metadata to automatically fill fields in the selected testing template; (6) identify at least one empty field in the selected testing template after the matched template metadata is used to automatically fill fields; (7) identify at least one database table and corresponding column in an application database that is mapped to the at least one identified empty field, wherein the application database stores information related to the application; (8) extract a filter condition and selection criteria from the determined features; (9) using the extracted filter condition and selection criteria and the at least one database table and corresponding column to generate a structured query language (SQL) statement; (10) execute the SQL statement to search for data corresponding to the at least one identified empty field; (11) use the data to fill the at least one identified empty field to produce a fully filled test template; and use the fully filled test template to execute the test scenario.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 7 shows a user interface, according to an embodiment.

DESCRIPTION OF EMBODIMENTS

Figure 1:
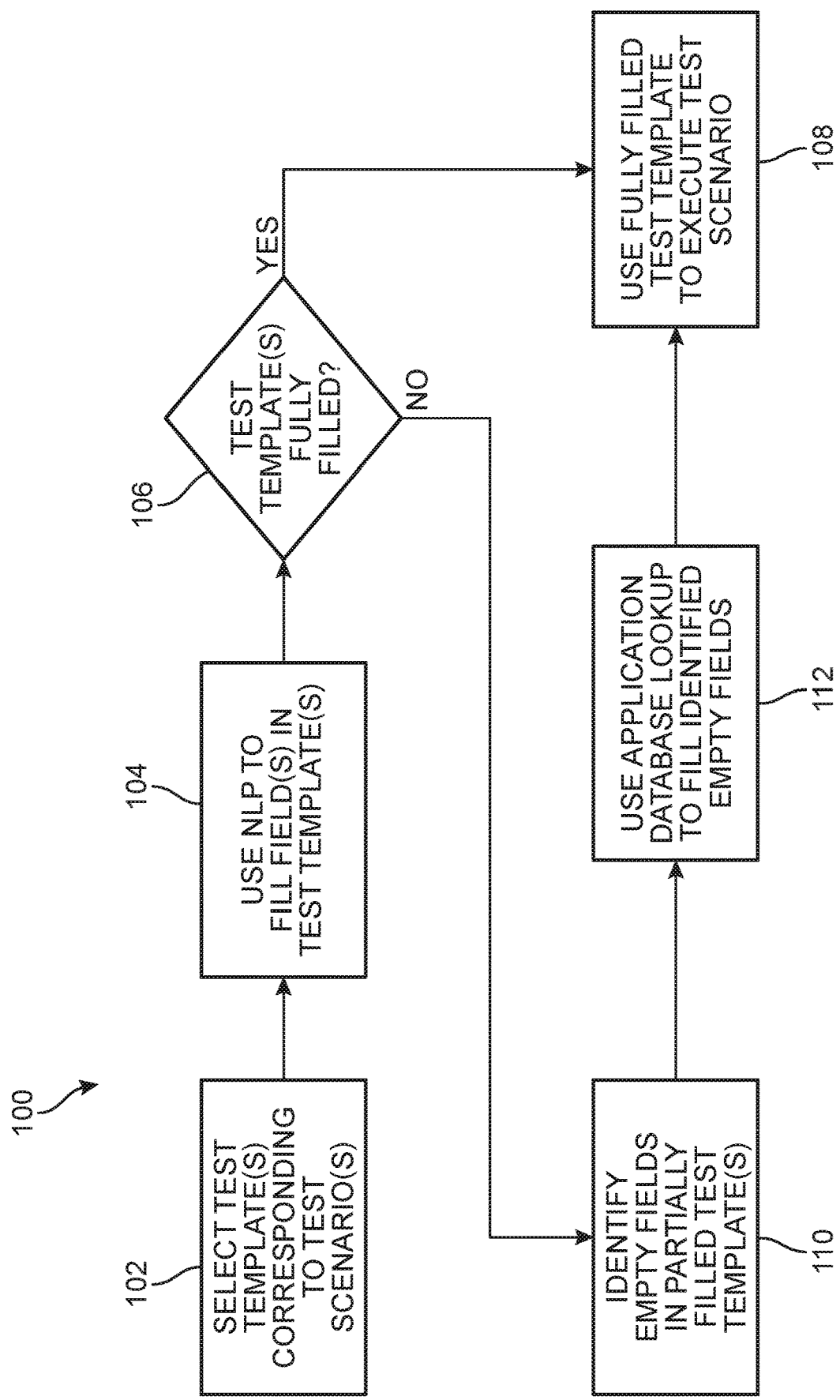
FIG. 1 shows a flowchart of an overview of a method of software testing, according to an embodiment.

FIG. 1 shows a flowchart of an overview a method of software testing 100 (or method 100), according to an embodiment. Method 100 includes selecting test template(s) corresponding to test scenarios (operation 102). Method 100 includes using NLP to fill field(s) in test template(s) (operation 104). Method 100 includes determining whether test template(s) are fully filled (operation 106). If the test template is fully filled, then operation 108 is performed in which the test template is used to execute the test scenario. If the test template is not fully filled, then operation 110 is performed in which empty fields in partially filled test template(s) are identified. Method 100 includes using an application database (e.g., a database storing information about the application being tested) lookup to fill identified empty fields (operation 112). Once full, the test template is used to execute the test scenario (operation 108). Details of these operations are discussed below.

In some embodiments, the disclosed system and method may be implemented into an automated testing platform (e.g., U.S. Pat. No. 10,073,763 to Venkata Raman et al., issued Sep. 11, 2018, which is hereby incorporated by reference in its entirety).

Figure 2:
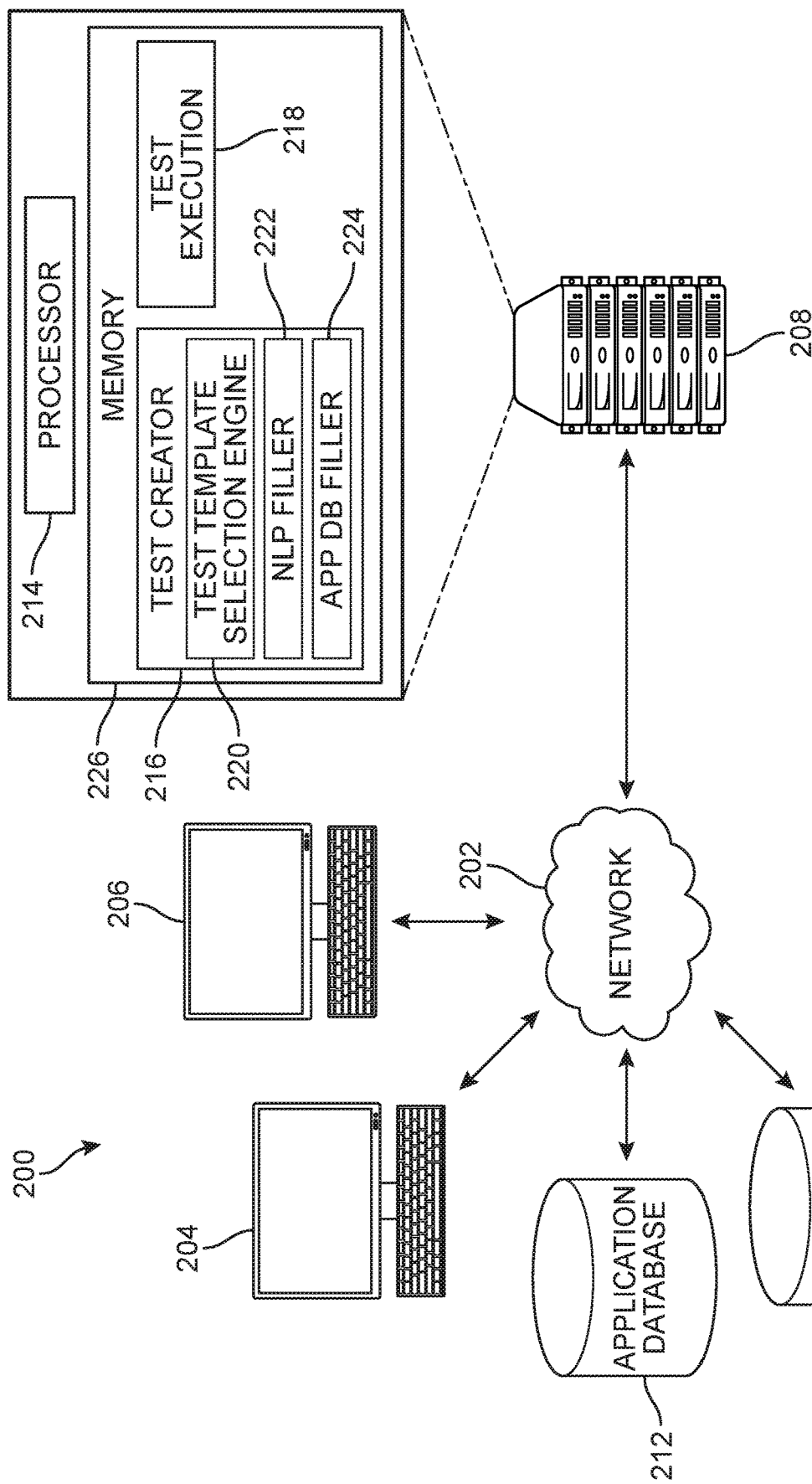
FIG. 2 shows a schematic diagram of a system for software testing according to an embodiment.

FIG. 2 shows a schematic diagram of a system for software testing 200 (or system 200), according to an embodiment. The disclosed system for software testing may include a plurality of components capable of performing the disclosed method (e.g., method 100). For example, system 200 includes a first user device 204, a second user device 206, a computing system 208, a template repository 210, and an application database 212. The components of system 200 can communicate with each other through a network 202. For example, user device 204 may retrieve information from application database 212 via network 202. In some embodiments, network 202 may be a wide area network ("WAN"), e.g., the Internet. In other embodiments, network 202 may be a local area network ("LAN").

While FIG. 2 shows two user devices, it is understood that one or more user devices may be used. For example, in some embodiments, the system may include three user devices. In another example, in some embodiments, 10 user devices may be used. The users may be testers using different devices. In some embodiments, the user devices may be computing devices used by a user. For example, first user device 204 and/or second user device 206 may include tablet computers. In other examples, first user device 204 and/or second user device 206 may be a smart phone, a laptop computer, a desktop computer, or another type of computing device. The user devices may be used for inputting, processing, and displaying information.

As shown in FIG. 2, in some embodiments, a test creator 216 and test execution engine 218 may be hosted in a computing system 208. Computing system 208 includes a processor 214 and a memory 226. Test creator 216 includes a test template selection engine 220, an NLP filler 222, and an application database filler 224. Processor 214 may include a single device processor located on a single device, or it may include multiple device processors located on one or more physical devices. Memory 226 may include any type of storage, which may be physically located on one physical device, or on multiple physical devices. In some cases, computing system 208 may comprise one or more servers that are used to host the test planner and text execution component.

Figure 3:
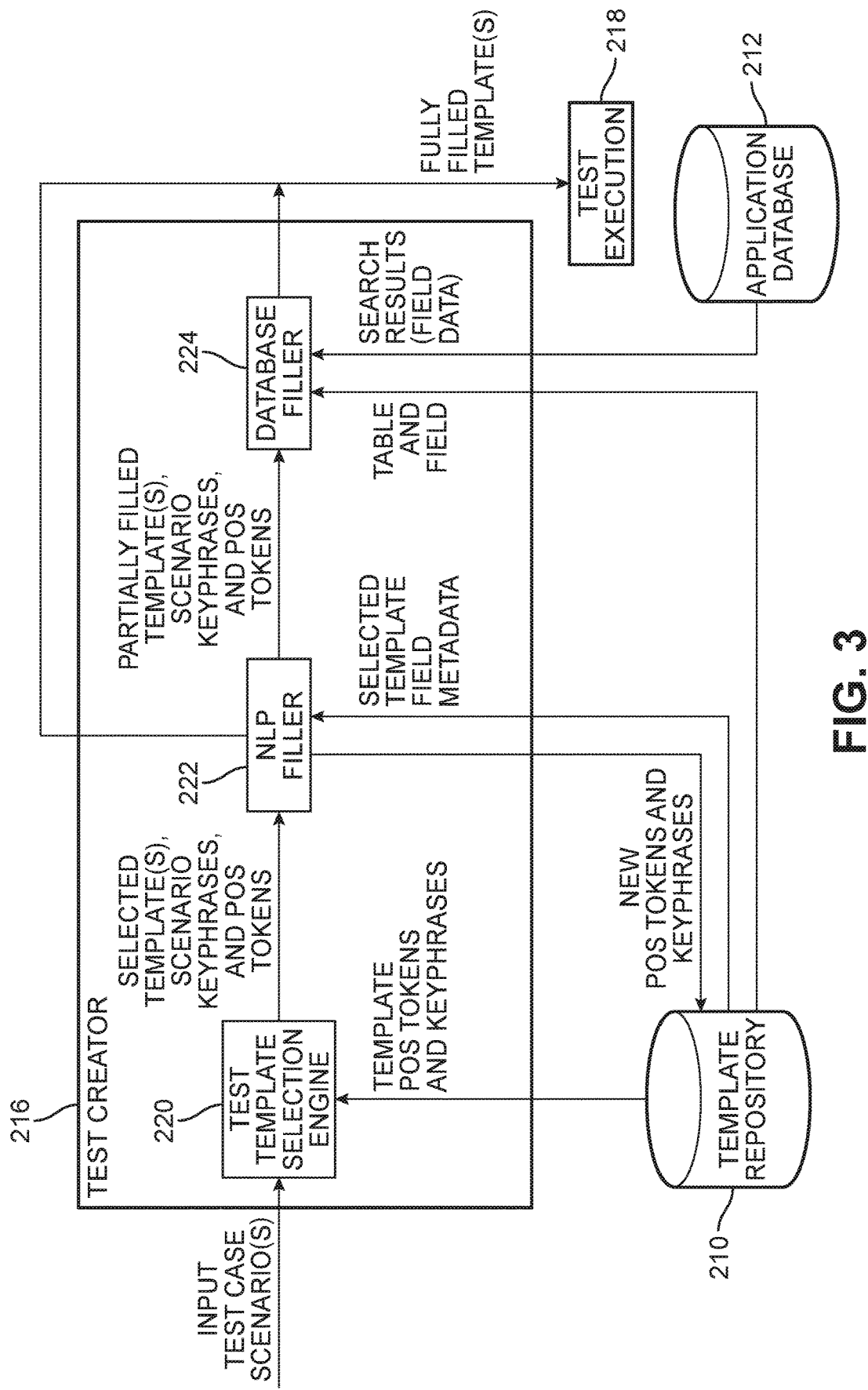
FIG. 3 shows a flow of information from components of the system, according to an embodiment.

FIG. 3 shows the flow of information between components of system 200, according to an embodiment. Test scenario(s) may be input into test template selection engine 220. As exemplified by method 100, the method may include selecting test template(s) corresponding to test scenarios. This operation, which is described in more detail below, is performed using keyphrases and POS tokens corresponding to template(s) provided in template repository 210, as well as keyphrases and POS tokens extracted from test scenarios. The performance of this operation results in a selection of template(s), which are input into NLP filler 222 with the extracted keyphrases and POS tokens. NLP filler 222 uses this input, as well as template metadata about fields in the selected template(s) (provided by template repository 210), to fill fields in the selected template(s). If this filling operation results in fully filled template(s), the fully filled template(s) are sent to test execution engine 218 for execution of the test scenario(s). If this filling operation results in partially filled template(s), the partially filled template(s) are input into database filler 224 with the extracted keyphrases and POS tokens. Database filler 224 identifies empty fields in the partially filled template(s) and uses this input, as well as table and field data (provided by template repository 210), to fill the empty fields in the selected template(s). After the empty fields are filled, the fully filled template(s) are sent to test execution engine 218 for execution of the test scenario(s).

Figure 4:
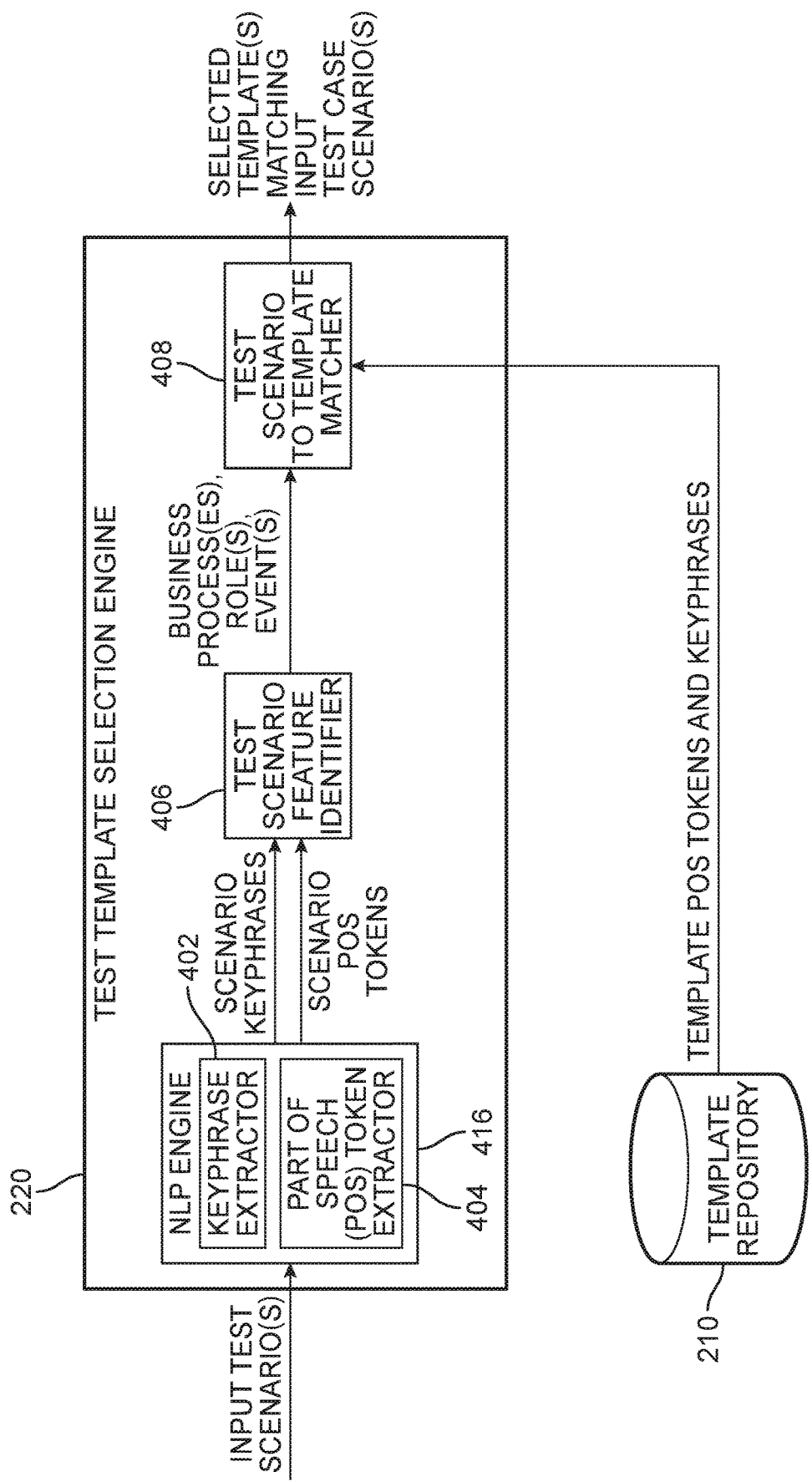
FIG. 4 shows a schematic diagram of a test template selection engine, according to an embodiment.

FIG. 4 shows a schematic diagram of test template selection engine 220, according to an embodiment. Test template selection engine 220 may include an NLP engine 416, a test scenario feature identifier 406, and a test scenario to template matcher 408. NLP engine 416 may include any suitable NLP engine that can extract keyphrases and POS tokens. For example, NLP engine 416 may be provided by Apache OpenNLP™. NLP engine 416 may include a keyphrase extractor 402 and a POS token extractor 404. As shown in FIG. 4, test scenarios may be input into NLP engine 416, where keyphrase extractor 402 may extract keyphrases from the test scenarios and POS token extractor 404 may extract POS tokens from the test scenarios. As mentioned before, test scenarios may include one or more test cases. In some cases, the test scenario may have a plurality of test case numbers that each include a plurality of test cases. Each test case may be include text descriptions summarizing the purpose, process, and expected result of test cases. For example, the text of a test scenario describing a test case may appear as follows: "To validate the insertion of IRS through the E-tradepad and perform Cancel & Reissue In event on the trade." In the same example, the same test case has a plurality of steps listed in the column next to the description of the test case. Two of the listed test steps appear as follows: "Login as 'AAA' and user group 'FO' in Murex GUI" and "Open e-tradepad screen." The acceptance criteria described next to these two test steps in the next column of the spreadsheet appear as: "User should be able to login to FO and launch e-tradepad."

In another example, the text of a test scenario describing a test case may appear as follows: "OSP Validation." In the same example, the same test case has a plurality of steps listed in the column next to the description of the test case. Two of the listed test steps appear as follows: "Validate the trade from Economic Exception queue" and "Validate the trade from Non-Economic Exceptions in queue." The acceptance criteria described next to each of these test steps, respectively, in the next column of the spreadsheet appear as: "User should be able to validate the trade from trade economic exception queue" and "User should be able to validate the trade from trade Non-economic Exception queue."

Keyphrase extractor 402 may include any suitable type of algorithm capable of extracting keyphrases from text. Keyphrase extractor 402 may apply machine learning to use NLP to identify words or phrases representing the most relevant information contained in the document. For example, a keyphrase extracted from the above example could be "OSP Validation." POS token extractor 404 may include any suitable type of POS token extractor capable of extracting POS tokens from text. POS token extractor 404 may apply machine learning to use NLP to identify the POS token corresponding to each word of the test scenario(s). In some embodiments, test scenario feature identifier 406 may use the extracted keyphrases to identify business processes (e.g., book a one-time trade) related to the test scenario(s). The extracted POS tokens may include at least nouns and verbs. In some embodiments, test scenario feature identifier 406 may use the nouns to identify roles related to the test scenario(s) and verbs to identify events related to the test scenario(s).

In some embodiments, test scenario feature to template matcher 408 may use the combination of business process, event, and role to search for templates corresponding to the business scenario in template repository 210. In such embodiments, for any combination of business process, event, and role, there may be only one applicable template. In some embodiments, the template may be selected by first selecting a first subset of templates based on an identified event. Events may have different naming conventions. For example, an event such as, "Cancel & Reissue", could be written in many ways, such as "CNR", "Cancel & Reissue", and "Cancel and Reissue." Then, a second subset of templates may be selected from the first subset of templates based on an identified business process. For example, a "Cancel & Reissue" template may be identified for an "Interest Rate Swap" business process. In some embodiments, the "Cancel & Reissue" template may be applicable for other business processes like "Foreign Exchange Spot." Finally, a third subset of templates may be selected from the second subset of templates based on the identified role. For example, a "Cancel & Reissue" request could be raised by identified roles, such as a "Retail Customer", "Commercial Bank", or a "Clearing House."

In some embodiments, test scenario feature to template matcher 408 may use keyphrases and POS tokens directly without the additional processing by scenario feature identifier 406. In some embodiments, test templates may include a form, such as a spreadsheet, providing various fields requiring information necessary for execution of the test template. For example, the fields may be in columns of a spreadsheet. In one example, the columns have labels appearing as follows: "Username", "Password", "Encrypted?", "Group", "Desk", "MarketDataSet", "MLC-workflow", "Limits.Preview.Mode", and "Session Nickname." In some embodiments, the test templates may each have multiple worksheets, each having fields. For example, in one embodiment, the worksheets may be labeled as "Description", "ConfigurationSyntax", "UserConfig", "NotepadConfig", "TradeDetails", and "TradeTicketHeader." The worksheets may not all be applicable to every test scenario. Test scenario feature to template matcher 408 may also match worksheets within selected test templates to the test scenario or test case of interest to identify which worksheets are mandatory and which worksheets are optional for a particular test scenario or test case. FIG. 7 shows a user interface 700 that shows user selectable test scenarios/test cases (e.g., "To validate the insertion of IRS through the E-tradepad and perform Cancel & Reissue In event on the trade") on the left hand side and the identified test templates (e.g., "Trade Insert") that have been selected by test template selection engine 220 on the right hand side. The center of interface 700 shows user selectable options for the selected templates. For example, the template called "Trade Insert" is selected in FIG. 7. The bottom of interface 700 shows user selectable worksheets (e.g., "Trade Details", "User Config", "Notepad Config.") corresponding to the template selected by the user using interface 700. The fields corresponding to the "Trade Insert" template are shown in the center of interface 700. For example, the worksheet called "Trade Details" is selected in FIG. 7. The fields (e.g., "Row_Label", "Row_Desc", "Group ID", "User Label", "Notepad Label") corresponding to the "Trade Details" worksheet in the "Trade Insert" template are shown in the center of interface 700. In some embodiments, the fields may be editable by the user before or after the system automatically fills the fields, for example, during operations 108 and 112. In some embodiments, color coding or other indicia may be used to indicate mandatory and/or optional fields.

In some embodiments, template repository 210 may include template level information, as well as worksheet and field level information. For every field, template repository 210 may maintain template metadata, such as a text description, data type, limits (if any), list of applicable values, relationships/dependencies with other fields within each template, mapping to the application screen and field, and mapping to the application database table and column. In some embodiments, the template metadata may be included in a spreadsheet with worksheets dedicated to different aspects of fields (e.g., description, configuration, syntax). In one example, a worksheet dedicated to syntax may describe the syntax of data column titles and values that could be used in configuration sheets. This explanation may include field settings (e.g., descriptions of when and how the following types of fields are used: simple field, split field, multiple legs, broadcaster leg, summary leg, and configure fields in open screens) for particular worksheets of individual templates. In some embodiments, the template metadata may include keyphrases and POS tokens. For example, the repository may store typical tokens and keyphrases used in test case/scenario descriptions for respective fields. In such embodiments, test scenario feature to template matcher 408 may match keyphrases and POS tokens of the test scenario(s) to templates including one or more of the same keyphrases and POS tokens. In other embodiments, the NLP engine can process the template metadata from template repository 210 to extract keyphrases and POS tokens from the template metadata before test scenario to template matcher 408 matches test scenarios to templates.

Figure 5:
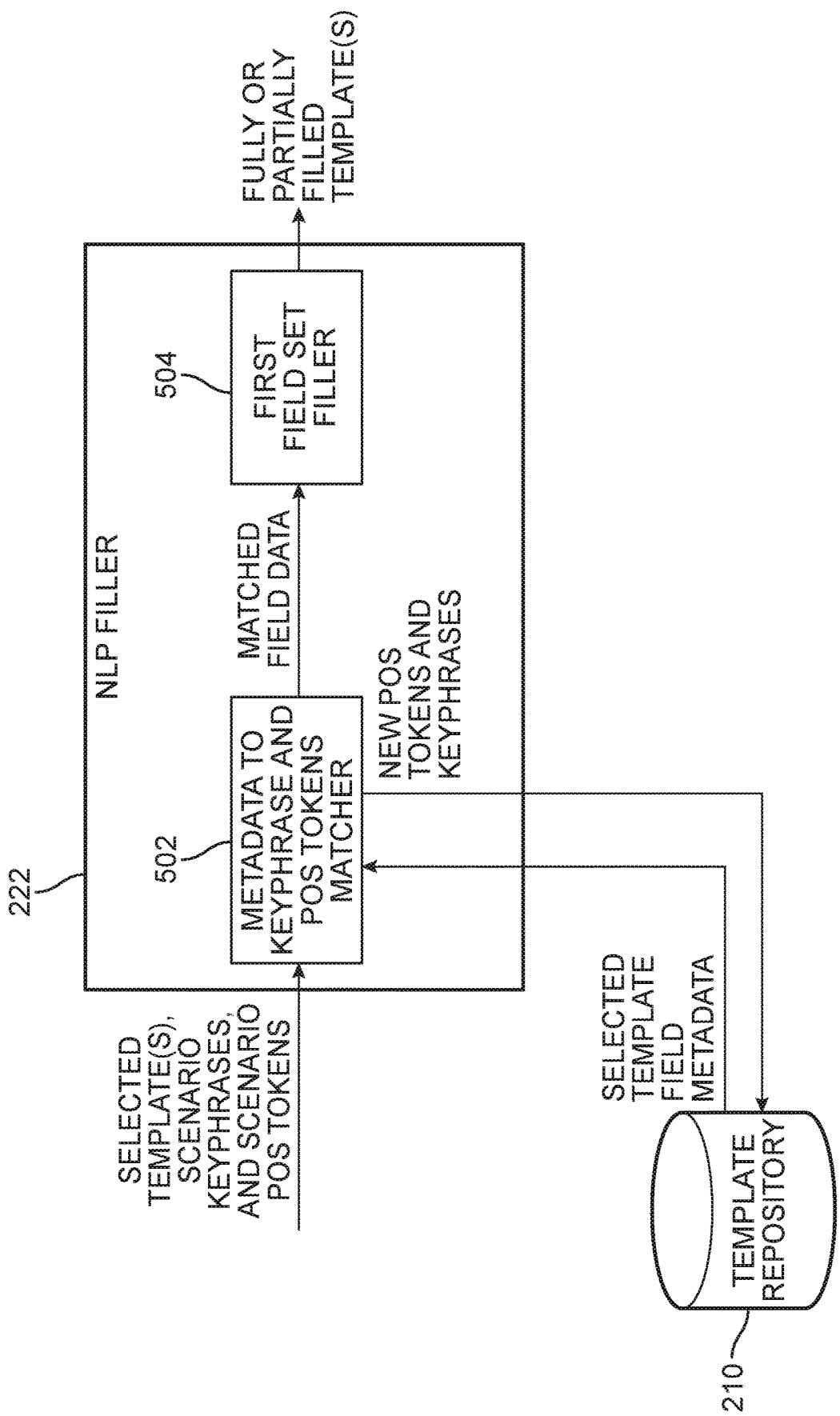
FIG. 5 shows a schematic diagram of a NLP filler, according to an embodiment.

FIG. 5 shows a schematic diagram of NLP filler 222, according to an embodiment. NLP filler 222 may include metadata to keyphrase and POS token matcher 502 and first field set filler 504. The selected template(s), scenario keyphrases, and scenario POS tokens output from test template selection engine 220 may be input into NLP filler 222. Metadata to keyphrase and POS token matcher 502 may match the scenario keyphrases and scenario POS tokens to template metadata corresponding to fields of the selected template(s). Keyphrase and POS token matcher 502 can read all of the template metadata in template repository 210 and compare the template metadata to extracted scenario keyphrases and/or POS tokens to find matches. First field set filler 504 may use the matched template metadata to fill fields in the selected template(s). In some cases, first field set filler 504 may output fully filled template(s). In other cases, first field set filler 504 may output partially filled template(s). In some embodiments, NLP filler 222 may identify if any new POS token and/or key phrase has been used to describe a field and can make relevant updates/entries in the template repository 210 for future use.

Figure 6:
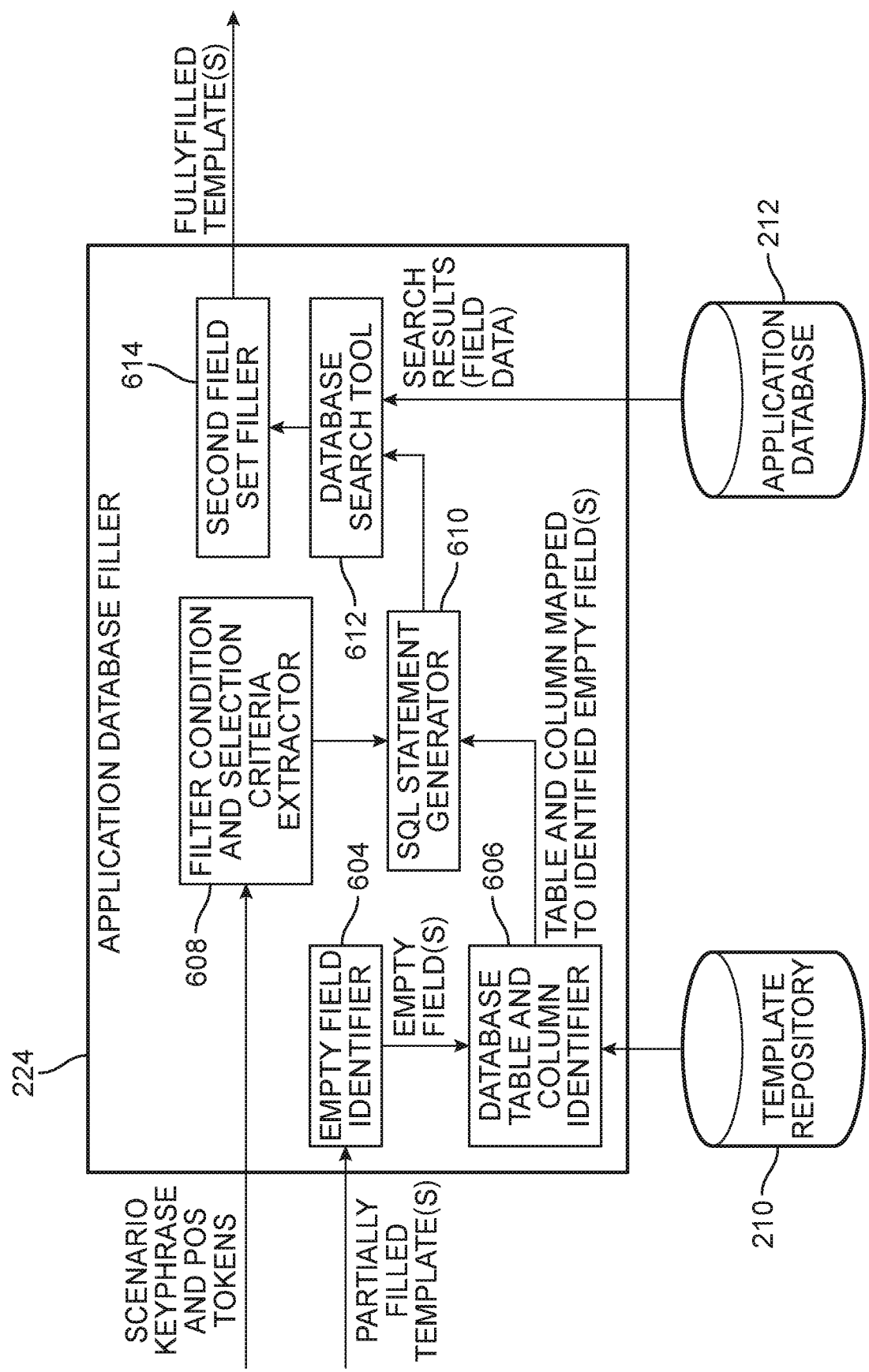
FIG. 6 shows a schematic diagram of an application database filler, according to an embodiment.

FIG. 6 shows a schematic diagram of application database filler 224, according to an embodiment. Application database filler 224 may include an empty field identifier 604, a database table and column identifier 606, a filter condition and selection criteria extractor 608, an structured query language (SQL), statement generator 610, a database search tool 612, and a second field set filler 614. Any partially filled template(s) output by NLP filler 222 may be input into empty field identifier 604. Empty field identifier 604 may identify empty field(s) in the partially filled template(s). For example, for every template there may be a predefined list of mandatory fields maintained in a repository (e.g., template repository). If a mandatory field is not identified from the test scenarios, it may be marked or identified as an "Empty Field." From template repository 210, database table and column identifier 606 may identify the database table and column mapped to each identified empty field. For example, a database may label a field as "M_INSTR" and the template may label the same field as "Instrument." "Instrument" may be the empty field, and database table and column identifier 606 may map this empty field's label to "M_INSTR." Then, application database filler 224 could perform the below described operations to use the term "M_INSTR" when searching the application database for information related to this database table and column, and could use the search results to fill the empty field.

Filter condition and selection criteria extractor 608 may extract filter condition and selection criteria from scenario keyphrases and POS tokens. For example, if a test scenario pertains to "Retail Customer with at least 3 Accounts" and the exact Customer Number is not mentioned in the test scenario, "Customer Type=Retail" could be applied as the filter condition and "Count of Accounts>=3" could be applied as the selection criterion. In some embodiments, SQL statement generator 610 may use the mapped database table(s) and column(s) and the identified filter condition and selection criteria to generate an SQL statement. For example, SQL statement generator 610 may use the mapped database table and column to generate an SQL statement and then may add the identified filter condition and selection criteria to the generated SQL statement. Database search tool 612 may execute the generated SQL statement to search application database 212 for empty field data. Second field set filler 614 may use the empty field data to fill the empty fields and output fully filled template(s).

In some embodiments, certain empty fields may not be fillable by using NLP to fill fields in the test template or by using an application database lookup to fill identified empty fields in the test template. A list of such fields may be generated, and human intervention may be requested to fill these fields.

Figure 8A:
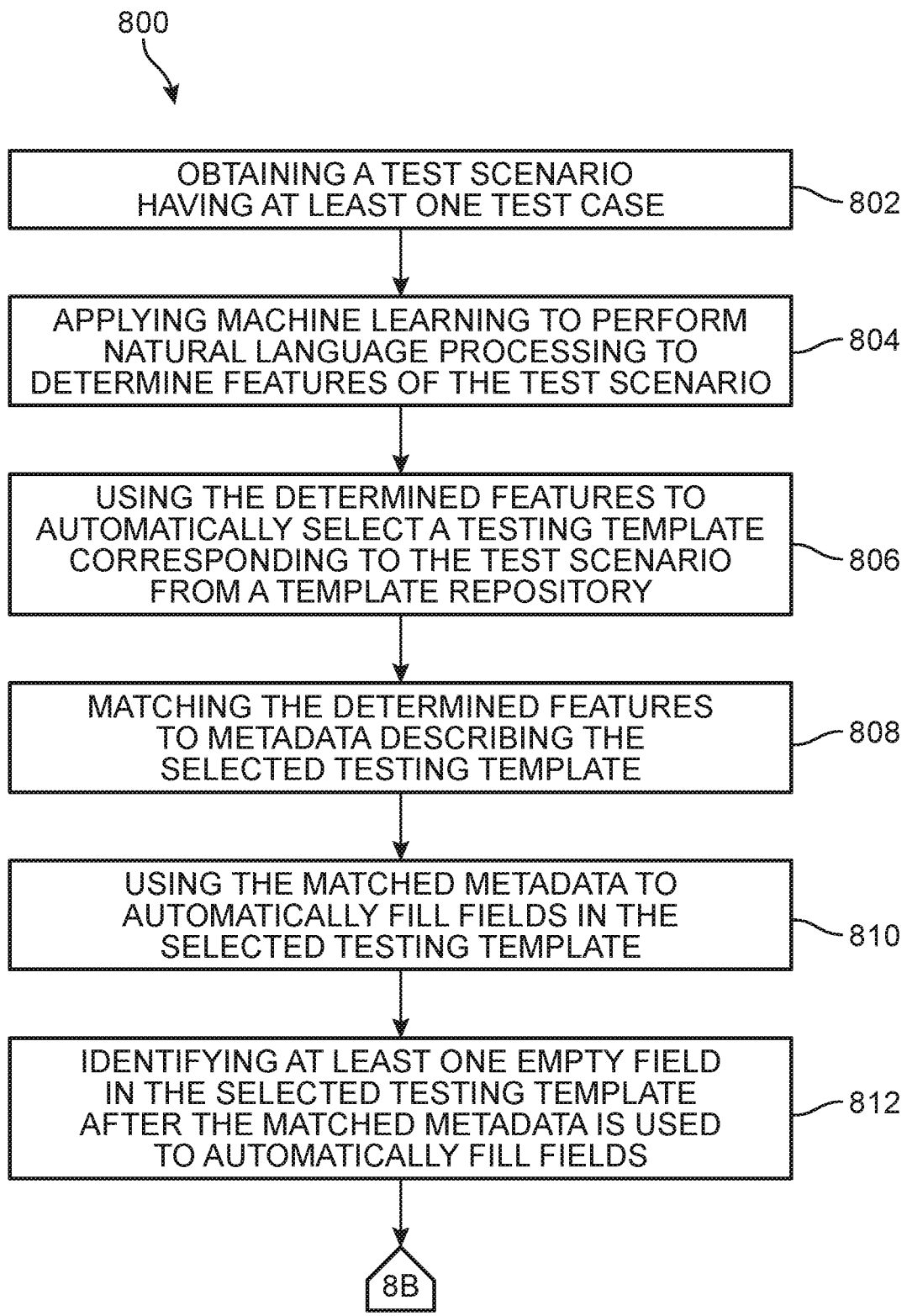
FIGS. 8A and 8B show a flowchart of a computer implemented method of software testing, according to an embodiment.
Figure 8B:
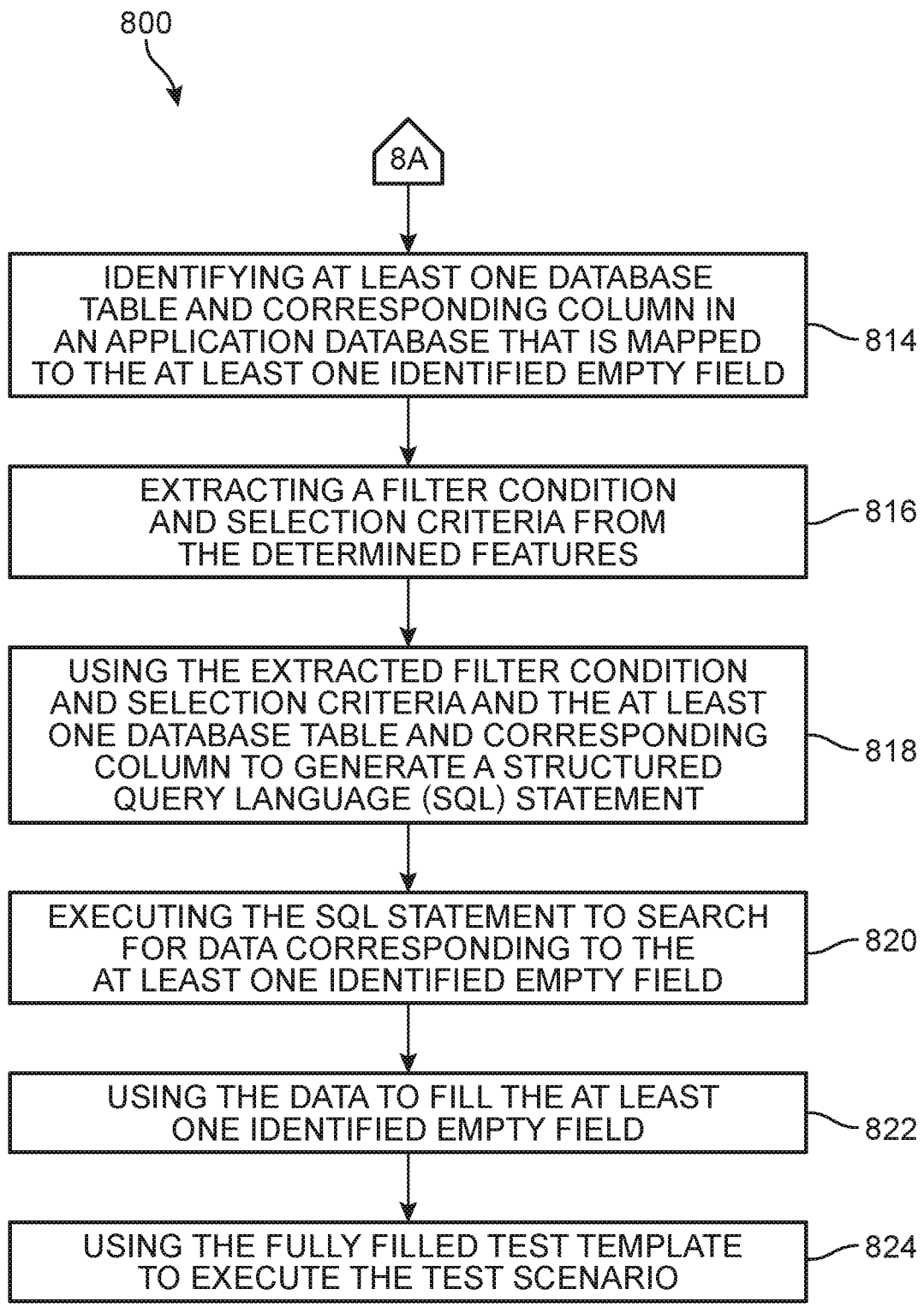

FIGS. 8A and 8B show a flowchart of a computer implemented method of software testing 800 (or method 800), according to an embodiment. Method 800 may include obtaining a test scenario having at least one test case, the test scenario configured to test an application. Method 800 may include applying machine learning to perform NLP to determine features of the test scenario. Method 800 may include using the determined features to automatically select a testing template corresponding to the test scenario from a template repository. In some embodiments, the determined features may include one or more of a business process, an event, and a role. In some embodiments, the determined features may include one or more of keyphrases and/or tokens extracted from test scenarios. Method 800 may include matching the determined features to template metadata describing the selected testing template. In some embodiments, the template metadata describing the selected testing template includes a template keyphrase and a template part-of-speech token. Method 800 may include using the matched template metadata to automatically fill fields in the selected testing template.

Method 800 may include identifying at least one empty field in the selected testing template after the matched template metadata is used to automatically fill fields. Method 800 may include identifying at least one database table and corresponding column in an application database that is mapped to the at least one identified empty field, wherein the application database stores information related to the application. Method 800 may include extracting a filter condition and selection criteria from the determined features. Method 800 may include using the extracted filter condition and selection criteria and the at least one database table and corresponding column to generate a SQL statement. In some embodiments, using the extracted filter condition and selection criteria and the at least one database table and corresponding column to generate the SQL statement includes using the at least one database table and corresponding column to generate the SQL statement and adding the extracted filter condition and selection criteria to the SQL statement. Method 800 may include executing the SQL statement to search for data corresponding to the at least one identified empty field. Method 800 may include using the data to fill the at least one identified empty field to produce a fully filled test template. Method 800 may include using the fully filled test template to execute the test scenario. In some embodiments, the disclosed system for software testing may include one or more computers and one or more storage devices storing instructions that are executable by one or more computers which, upon such execution, cause the one or more computers to perform the operations described with respect to the methods described herein. In some embodiments, a non-transitory computer-readable medium may store software comprising instructions executable by one or more computers which, upon such execution, cause the one or more computers to perform the operations described with respect to the methods described herein.

In some embodiments, the disclosed method may include converting the text of test case documents into word embeddings (e.g., using word2vec) to put the text into a format more suitable for machine learning. As discussed below, these word embeddings may be used/analyzed to determine the similarity between pairs of test cases.

It should be understood that the systems and/or methods as described herein may be implemented using different computing systems, components, modules, and connections. An end-user or administrator may access various interfaces provided or supported by the policy management service, for example, via one or more devices capable of receiving, generating, storing, processing, and/or providing information, such as information described herein. For example, a user device may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device may receive information from and/or transmit information to the policy management service platform. For example, a device may include a bus, a processor, a memory, a storage component, an input component, an output component, and a communication interface.

The bus will include a component that permits communication among the components of the device. The processor is implemented in hardware, firmware, or a combination of hardware and software. The processor is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, a processor includes one or more processors capable of being programmed to perform a function. Memory includes a random access memory (RAM), a read only memory (ROM), and/or another type of dynamic or static storage device (e.g., a flash memory, a magnetic memory, and/or an optical memory) that stores information and/or instructions for use by a processor(s).

In addition, storage components store information and/or software related to the operation and use of the device. For example, storage components may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Furthermore, an input component includes a component that permits the device to receive information, such as via user input (e.g., a touch screen display, a keyboard, a keypad, a mouse, a button, a switch, and/or a microphone). Additionally, or alternatively, input components may include a sensor for sensing information (e.g., a global positioning system (GPS) component, an accelerometer, a gyroscope, and/or an actuator). The output component includes a component that provides output information from a device (e.g., a display, a speaker, and/or one or more light-emitting diodes (LEDs)).

A communication interface includes a transceiver-like component (e.g., a transceiver and/or a separate receiver and transmitter) that enables a device to communicate with other devices, such as via a wired connection, a wireless connection, or a combination of wired and wireless connections. The communication interface may permit the device to receive information from another device and/or provide information to another device. For example, a communication interface may include an Ethernet interface, an optical interface, a coaxial interface, an infrared interface, a radio frequency (RF) interface, a universal serial bus (USB) interface, a Wi-Fi interface, a cellular network interface, and/or the like.

Thus, the device may perform one or more processes described herein. The device may perform these processes based on processor executing software instructions stored by a non-transitory computer-readable medium, such as memory and/or storage component. A computer-readable medium is defined herein as a non-transitory memory device. A memory device includes memory space within a single physical storage device or memory space spread across multiple physical storage devices.

Software instructions may be read into memory and/or storage components from another computer-readable medium or from another device via communication interface. When executed, software instructions stored in memory and/or storage component may cause processor to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

In some implementations, a policy management service may be hosted in a cloud computing environment. Notably, while implementations described herein describe a policy management service as being hosted in cloud computing environment, in some implementations, a policy management service may not be cloud-based (i.e., may be implemented outside of a cloud computing environment) or may be partially cloud-based.

Cloud computing environment can include, for example, an environment that hosts the policy management service. The cloud computing environment may provide computation, software, data access, storage, etc. services that do not require end-user knowledge of a physical location and configuration of system(s) and/or device(s) that hosts the policy management service. For example, a cloud computing environment may include a group of computing resources (referred to collectively as "computing resources" and individually as "computing resource").

Computing resources includes one or more personal computers, workstation computers, server devices, or other types of computation and/or communication devices. In some implementations, computing resources may host the policy management service. The cloud resources may include compute instances executing in computing resource, storage devices provided in computing resource, data transfer devices provided by computing resource, etc. In some implementations, computing resource may communicate with other computing resources via wired connections, wireless connections, or a combination of wired and wireless connections. In some embodiments, a computing resource includes a group of cloud resources, such as one or more applications ("APPs"), one or more virtual machines ("VMs"), virtualized storage ("VSs"), one or more hypervisors ("HYPs"), and/or the like.

Application includes one or more software applications that may be provided to or accessed by user devices. Application may eliminate a need to install and execute the software applications on a user device. For example, an application may include software associated with the policy management service and/or any other software capable of being provided via cloud computing environment, while in some embodiments, other applications are provided via virtual machines. A virtual machine can include a software implementation of a machine (e.g., a computer) that executes programs like a physical machine. A virtual machine may be either a system virtual machine or a process virtual machine, depending upon use and degree of correspondence to any real machine by virtual machine. A system virtual machine may provide a complete system platform that supports execution of a complete operating system ("OS"). A process virtual machine may execute a single program, and may support a single process. In some embodiments, virtual machines may execute on behalf of a user (e.g., a user of user device or an administrator of the policy management service), and may manage infrastructure of cloud computing environment, such as data management, synchronization, or long-duration data transfers.

Virtualized storage includes one or more storage systems and/or one or more devices that use virtualization techniques within the storage systems or devices of computing resources. In some embodiments, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisors may provide hardware virtualization techniques that allow multiple operating systems (e.g., "guest operating systems") to execute concurrently on a host computer, such as a computing resource. Hypervisors may present a virtual operating platform to the guest operating systems, and may manage the execution of the guest operating systems. Multiple instances of a variety of operating systems may share virtualized hardware resources.

A network includes one or more wired and/or wireless networks. For example, networks may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A computer implemented method of testing software, comprising:
    obtaining a test scenario having at least one test case, the test scenario configured to test an application;
    applying machine learning to perform natural language processing (NLP) to determine features of the test scenario;
    using the determined features to automatically select a testing template corresponding to the test scenario from a template repository;
    matching the determined features to template metadata describing the selected testing template;
    using the matched template metadata to automatically fill fields in the selected testing template; and
    using the filled test template to execute the test scenario.

2. The computer implemented method of claim 1, further comprising:
    identifying at least one empty field in the selected testing template after the matched template metadata is used to automatically fill fields;
    identifying at least one database table and corresponding column in an application database that is mapped to the at least one identified empty field, wherein the application database stores information related to the application;
    using the at least one database table and corresponding column to generate a structured query language (SQL) statement;
    executing the SQL statement to search for data corresponding to the at least one identified empty field; and
    using the data to fill the at least one identified empty field to produce a fully filled test template,
    wherein using the filled test template to execute the test scenario includes using the fully filled test template.

3. The computer implemented method of claim 2, further comprising:
    extracting a filter condition and selection criteria from the determined features, wherein using the at least one database table and corresponding column to generate the SQL statement includes using the extracted filter condition and selection criteria and the at least one database table and corresponding column to generate the SQL statement.

4. The computer implemented method of claim 3, wherein using the extracted filter condition and selection criteria and the at least one database table and corresponding column to generate the SQL statement comprises:
    using the at least one database table and corresponding column to generate the SQL statement; and
    adding the extracted filter condition and selection criteria to the SQL statement.

5. The computer implemented method of claim 1, wherein the determined features include one or more of a business process, an event, and a role.

6. The computer implemented method of claim 1, wherein the determined features include one or more of a scenario keyphrase and a scenario part-of-speech token.

7. The computer implemented method of claim 1, wherein the template metadata describing the selected testing template includes a template keyphrase and a template part-of-speech token.

8. A non-transitory computer-readable medium storing software comprising instructions executable by one or more computers which, upon such execution, cause the one or more computers to perform the following operations:
    obtaining a test scenario having at least one test case, the test scenario configured to test an application;
    applying machine learning to perform natural language processing (NLP) to determine features of the test scenario;
    using the determined features to automatically select a testing template corresponding to the test scenario from a template repository;
    matching the determined features to template metadata describing the selected testing template;
    using the matched template metadata to automatically fill fields in the selected testing template; and
    using the filled test template to execute the test scenario.

9. The non-transitory computer-readable medium storing software of claim 8, wherein the operations further comprise:
    identifying at least one empty field in the selected testing template after the matched template metadata is used to automatically fill fields;
    identifying at least one database table and corresponding column in an application database that is mapped to the at least one identified empty field, wherein the application database stores information related to the application;
    using the at least one database table and corresponding column to generate a structured query language (SQL) statement;

executing the SQL statement to search for data corresponding to the at least one identified empty field; and using the data to fill the at least one identified empty field to produce a fully filled test template, wherein using the filled test template to execute the test scenario includes using the fully filled test template.

10. The non-transitory computer-readable medium storing software of claim 9, wherein the operations further comprise:

extracting a filter condition and selection criteria from the determined features, wherein using the at least one database table and corresponding column to generate the SQL statement includes using the extracted filter condition and selection criteria and the at least one database table and corresponding column to generate the SQL statement.

11. The non-transitory computer-readable medium storing software of claim 10, wherein using the extracted filter condition and selection criteria and the at least one database table and corresponding column to generate the SQL statement comprises:

using the at least one database table and corresponding column to generate the SQL statement; and adding the extracted filter condition and selection criteria to the SQL statement.

12. The non-transitory computer-readable medium storing software of claim 8, wherein the determined features include one or more of a business process, an event, and a role.

13. The non-transitory computer-readable medium storing software of claim 8, wherein the determined features include one or more of a scenario keyphrase and a scenario part-of-speech token.

14. The non-transitory computer-readable medium storing software of claim 8, wherein the template metadata describing the selected testing template includes a template keyphrase and a template part-of-speech token.

15. A system for testing software, comprising:

one or more computers and one or more storage devices storing instructions that are executable by one or more computers which, upon such execution, cause the one or more computers to perform the following operations:

obtaining a test scenario having at least one test case, the test scenario configured to test an application;

applying machine learning to perform natural language processing (NLP) to determine features of the test scenario;

using the determined features to automatically select a testing template corresponding to the test scenario from a template repository;

matching the determined features to template metadata describing the selected testing template;

using the matched template metadata to automatically fill fields in the selected testing template; and using the filled test template to execute the test scenario.

16. The system of claim 15, wherein the operations further comprise:

identifying at least one empty field in the selected testing template after the matched template metadata is used to automatically fill fields;

identifying at least one database table and corresponding column in an application database that is mapped to the at least one identified empty field, wherein the application database stores information related to the application;

using the at least one database table and corresponding column to generate a structured query language (SQL) statement;

executing the SQL statement to search for data corresponding to the at least one identified empty field; and using the data to fill the at least one identified empty field to produce a fully filled test template, wherein using the filled test template to execute the test scenario includes using the fully filled test template.

17. The system of claim 16, wherein the operations further comprise:

extracting a filter condition and selection criteria from the determined features, wherein using the at least one database table and corresponding column to generate the SQL statement includes using the extracted filter condition and selection criteria and the at least one database table and corresponding column to generate the SQL statement.

18. The system of claim 17, wherein using the extracted filter condition and selection criteria and the at least one database table and corresponding column to generate the SQL statement comprises:

using the at least one database table and corresponding column to generate the SQL statement; and adding the extracted filter condition and selection criteria to the SQL statement.

19. The system claim 15, wherein the determined features include one or more of a business process, an event, and a role.

20. The system of claim 15, wherein the determined features include one or more of a scenario keyphrase and a scenario part-of-speech token.

* * * * *